US012686626B2

(12) United States Patent
Sturm et al.

(10) Patent No.: US 12,686,626 B2
(45) Date of Patent: Jul. 21, 2026

(54) BIOREACTOR GARDEN WASTEWATER TREATMENT SYSTEM

(71) Applicants: Paul E. Sturm, Sykesville, MD (US); Phalgun Mantha, Bloomfield Hills, MI (US)

(72) Inventors: Paul E. Sturm, Sykesville, MD (US); Phalgun Mantha, Bloomfield Hills, MI (US)

( * ) Notice: Subject to any disclaimer, the term of this patent is extended or adjusted under 35 U.S.C. 154(b) by 459 days.

(21) Appl. No.: 18/125,049

(22) Filed: Mar. 22, 2023

(65) Prior Publication Data

US 2023/0331608 A1 Oct. 19, 2023

Related U.S. Application Data

(60) Provisional application No. 63/330,629, filed on Apr. 13, 2022.

(51) Int. Cl.
C02F 3/30 (2023.01)
C02F 3/32 (2023.01)
(Continued)

(52) U.S. Cl.
CPC ............... C02F 3/302 (2013.01); C02F 3/32 (2013.01); C02F 3/34 (2013.01);
(Continued)

(58) Field of Classification Search
CPC .... C02F 3/302; C02F 3/32; C02F 3/34; C02F 2101/105; C02F 2101/16; C02F 2103/005;
(Continued)

(56) References Cited

U.S. PATENT DOCUMENTS 6,652,743 B2 * 11/2003 Wallace ................... C02F 3/32
 210/220
7,776,217 B2 8/2010 Lucas
 (Continued)

FOREIGN PATENT DOCUMENTS

CN 100518834 C * 7/2009 ............. A61L 9/013
CN 103803709 A 5/2014
 (Continued)

OTHER PUBLICATIONS

Translation of Kameda (JP-2005074407-A) (Year: 2005).*
 (Continued)

*Primary Examiner* — Ekandra S. Miller-Cruz
(74) *Attorney, Agent, or Firm* — Maxwell J. Petersen; FisherBroyles, LLP

(57) ABSTRACT

A wastewater treatment system for households, individual buildings, hotels, neighborhoods, and wastewater treatment plants is designed to treat wastewater effluent from an initial treatment system such as a septic tank or a primary or secondary treatment system. A self-regenerating bioreactor garden is connected in series with the initial treatment system. The self-regenerating bioreactor garden receives untreated or minimally treated wastewater effluent from the initial treatment system and is designed to dramatically reduce the volume and concentrations of nitrogen, phosphorus, biological oxygen demand, and suspended sediments in the wastewater effluent so that the treated wastewater effluent can be discharged directly into leach field, seepage pit, injection well, or another surrounding environment. The self-regenerating bioreactor garden can meet or exceed the applicable requirements of National Sanitation Foundation, including NSF 245 and NSF 40, and equivalent standards.

31 Claims, 3 Drawing Sheets

(51) Int. Cl.

| | | |
|---|---|---|
| *C02F 3/34* | (2023.01) | |
| *C02F 101/10* | (2006.01) | |
| *C02F 101/16* | (2006.01) | |
| *C02F 103/00* | (2006.01) | |

(52) U.S. Cl.
CPC .... *C02F 2101/105* (2013.01); *C02F 2101/16* (2013.01); *C02F 2103/005* (2013.01); *C02F 2203/006* (2013.01)

(58) Field of Classification Search
CPC .... C02F 2203/006; C02F 1/004; C02F 3/301; C02F 2101/38; C02F 2203/008; Y02W 10/10
USPC ........................................................ 210/630
See application file for complete search history.

(56) References Cited

U.S. PATENT DOCUMENTS

| | | |
|---|---|---|
| 9,764,974 B2 | 9/2017 | Chai et al. |
| 2021/0171379 A1 | 6/2021 | Xi et al. |
| 2022/0074157 A1 | 3/2022 | Zheng et al. |

FOREIGN PATENT DOCUMENTS

| | | | | |
|---|---|---|---|---|
| CN | 105060631 | A | 11/2015 | |
| CN | 207418393 | U | 5/2018 | |
| CN | 207608461 | U | 7/2018 | |
| CN | 209242760 | U | 8/2019 | |
| CN | 209740823 | U | 12/2019 | |
| CN | 107540094 | B | 9/2020 | |
| CN | 211445427 | U | 9/2020 | |
| JP | 2005074407 | A * | 3/2005 | ............... C02F 1/58 |
| WO | 2017046456 | A1 | 3/2017 | |
| WO | 2020252870 | A1 | 12/2020 | |

OTHER PUBLICATIONS

Zhang Hongwei et al: "Bioretention for Removal of Nitrogen: Processes, Operational Conditions, and Strategies for Improvement," Environmental science and Pollution Research, vol. 28, No. 9, Jan. 14, 2021.

Combined European Search Report and Opinion for EP23166166.1, dated Jul. 4, 2023.

Ridge to Reefs, "Bioreactor Gardens, " https://www.ridgetoreefs.org/bioreactor-gardens, downloaded Feb. 17, 2022, published Apr. 14, 2021.

United States Environmental Protection Agency "Types of Septic Systems," https://www.epa.gov/septic/types-septic-systems, downloaded Feb. 17, 2022.

Extended European Search Report and Opinion for EP23166166.1, dated Oct. 1, 2025.

* cited by examiner

BIOREACTOR GARDEN WASTEWATER TREATMENT SYSTEM

RELATED APPLICATIONS

This patent application claims the benefit of U.S. Provisional Application 63/330,629, filed on Apr. 13, 2022, the disclosure of which is incorporated herein by reference.

FIELD OF THE INVENTION

This invention is directed to a wastewater treatment system for use with individual or multiple households, hotels, and other buildings, as well as tertiary treatment at a primary or secondary wastewater plant for eliminating pollution normally associated with treated or partially treated wastewater and the like and, in some instances, enabling the reuse of the water.

BACKGROUND OF THE INVENTION

Individual or multi-dwelling units or group systems that utilize cesspools and/or septic tanks are commonly used in temperate, subtropical and tropical regions to treat wastewater that is discharged from households and businesses. All of these systems have limitations in terms of the quality of effluent that they produce. Primary or secondary wastewater plants are also used in many areas for treatment of wastewater but have the potential to impair surface or groundwater with their effluent. In Hawaii, for example, it is common for individual households and other buildings to be equipped with a cesspool that is used both for treatment and disposal of wastewater. Cesspools are not an acceptable form of treatment for wastewater due to their contamination of groundwater or surface water and have been banned across the United States for 40 years but have only recently received increased scrutiny in Hawaii. The cesspool, septic tank or primary or secondary wastewater plant is used for the settling and accumulation of solid waste as well as some improvements in water quality. Solid waste is periodically removed by some homeowners and entities by pumping out the cesspool or septic tank. Solid waste is also removed by wastewater treatment plant operators as part of the operation and maintenance of their systems. The primarily liquid and solid overflow from the home or business is discharged into a leach field that gradually releases the effluent into the surrounding ground, whereupon the leach field and ground may only perform limited filtration of the effluent. The treated wastewater being discharged from the cesspool, septic system, ATU or into the surrounding ground is not pure, and often contains bacteria, nutrients and other impurities that can exceed the permissible levels in drinking water and can otherwise contaminate the surrounding environment. This can be especially problematic in areas that rely on groundwater as a primary source of drinking water. Additional pollution can result when effluent from a cesspool discharges to a fractured geology or limestone, effectively releasing minimally treated sewage into the environment.

There is a need or desire for an improved wastewater treatment system that can be comfortably installed on individually owned land plots, can be used by individual households, building owners, or wastewater plants that can substantially reduce the pollution resulting from primary and secondary treated wastewater.

There is also a need or desire for such a wastewater treatment system that can, via sufficient or further treatment of the wastewater, enable re-use of the treated wastewater for landscaping, agroforestry, agriculture or drinking water.

SUMMARY OF THE INVENTION

The invention is directed to an individualized or group wastewater treatment system that is designed for installation and use by individual homeowners or a group, public bathroom and shower facilities, residential communities, greenhouses, private injection wells, commercial buildings such as hotels, or as a low cost tertiary system at a wastewater plant, entails little maintenance and minimal cost, and achieves a remarkably high breakdown and reduction in nitrogen, phosphorus, and sediment from the wastewater effluent before the effluent is discharged into the surrounding environment. The wastewater treatment system can include an initial treatment system and a self-regenerating bioreactor garden. The initial treatment system can be a septic tank or a primary or secondary wastewater treatment system that discharges partially treated wastewater to the self-regenerating bioreactor garden, which can be connected in series and downstream from the septic tank or other initial treatment system. The wastewater treatment system can include a treated wastewater discharge from the self-regenerating bioreactor garden either into the surrounding environment via a leach field, or to one or more further treatment steps that can render the treated wastewater re-usable in irrigation for landscaping, agroforestry, greenhouses, or agriculture, or for drinking water. The further treatment steps can include, for example, passing the treated wastewater through an additional layer of biochar and/or sand, and can include further treating the wastewater with ultraviolet radiation or another sterilizing treatment.

The septic tank can receive untreated wastewater directly from the building and performs the function of allowing much of the solid components to separate and settle from the liquid (effluent) component of the wastewater. The septic tank should have a sufficient volume to allow the solid component to settle for extended periods of time, for example one to three years, before the solids accumulate to a level that requires pumping and removal from the septic tank.

The self-regenerating bioreactor garden can be specially designed and tailored with natural plants from the local environment that do not require replenishment or replacement. The design of the self-regenerating bioreactor garden enables the effluent wastewater from the septic tank to feed and nourish the plants using the nitrogen and phosphorus-containing pollutants from the wastewater, while simultaneously breaking down the nitrogen and phosphorus-containing compounds. The freed nitrogen can be released into the atmosphere or absorbed by the plants in the bioreactor garden, and the resulting phosphorus or phosphorus compounds can be absorbed in the bioreactor garden, resulting in a dramatic reduction in nitrogen and phosphorus-containing compounds in the treated wastewater effluent that is released into the environment. This reflects an important advantage of a self-regenerating bioreactor garden that renders the wastewater treatment system amenable to widespread individual use. Unlike other treatment systems that require expert maintenance and care, the self-regenerating bioreactor garden used with the invention can be operated indefinitely with little or no maintenance by the individual user.

The treated wastewater can be at least partially absorbed by the plants in the self-regenerating bioreactor garden, and any excess treated wastewater can be discharged from the self-regenerating bioreactor garden. In one embodiment, the excess treated wastewater can be discharged into an adjacent leach field. The leach field can be provided with plants that absorb and transpire the treated wastewater, to reduce or minimize the area required for the leach field. In another embodiment, the excess treated wastewater can be subjected to one or more further treatments that render the wastewater re-usable for irrigation for landscaping, agroforestry, greenhouses, or agriculture, or for drinking water. The additional treatment(s) can include, for example, passing the treated wastewater through an additional bed of biochar and/or sand, and can include subjecting the treated wastewater to ultraviolet radiation or another sterilizing treatment.

With the foregoing in mind, one embodiment of the invention is directed to a wastewater treatment system that includes:

an initial treatment system adapted to receive untreated wastewater; and a self-regenerating bioreactor garden downstream from and connected in series with the initial treatment system;

wherein the self-regenerating bioreactor garden receives untreated or minimally treated wastewater effluent from the initial treatment system and releases treated wastewater effluent;

and the self-regenerating bioreactor garden reacts with nitrogen-containing compounds in the untreated or minimally wastewater effluent to cause the treated wastewater effluent to have a total nitrogen content at least about 65% less than a nitrogen content of the untreated or minimally treated wastewater effluent.

In the foregoing embodiment, the initial treatment system can be a septic tank, an injection well site, an initial (for example, primary or secondary) wastewater treatment plant, or another device for initial treatment of the wastewater. For example, the initial treatment can be provided by an initial (primary or secondary) wastewater treatment plant. The initial treatment system can also be a group septic system or primary or secondary package plant for a neighborhood or multi-family residential setting of apartments, condominiums, a hotel, or commercial entity. In each case, the untreated or minimally treated effluent from the initial treatment system is directed to the self-regenerating bioreactor garden. Because the initial treatment system is believed to result in no or minimal reduction of nitrogen content in the wastewater effluent, the total nitrogen content can be measured either from the inlet to the bioreactor garden or the inlet to the overall system, and to the point of discharge from the bioreactor garden, for purposes of measuring the "at least about 65%" loss in nitrogen content. As explained above, the treated wastewater effluent from the bioreactor garden can be directed to a leach field and discharged to the environment or can be subjected to one or more further treatments that result in further reduction in nitrogen content. The further treated wastewater can then be discharged as water for irrigation, or as drinking water, and can be discharged using injection well or piped discharge depending on federal, state, and local regulations.

Another embodiment of the invention is directed to an individualized wastewater treatment system that includes:

a septic tank adapted to receive untreated wastewater from a building; and a self-regenerating bioreactor garden downstream from and connected in series with the septic tank;

wherein the self-regenerating bioreactor garden receives untreated or minimally treated wastewater effluent from the septic tank and is sized such that the plants in the self-regenerating bioreactor garden uptake and transpire an entirety of the untreated wastewater effluent resulting in zero discharge from the wastewater treatment system.

Another embodiment of the invention is directed to wastewater treatment system that includes:

a septic tank adapted to receive untreated wastewater directly from a building; and a self-regenerating bioreactor garden downstream from and connected in series with the septic tank;

wherein the self-regenerating bioreactor garden receives untreated wastewater effluent from the septic tank and releases treated wastewater effluent directly into a leaching field;

and the self-regenerating bioreactor garden reacts with nitrogen-containing compounds and phosphorus-containing compounds in the untreated wastewater effluent to cause the treated wastewater effluent to have a nitrogen content at least about 65% less than a nitrogen content of the untreated wastewater effluent and a phosphorus content at least about 65% less than a phosphorus content of the untreated wastewater effluent.

Again, because the initial treatment in the septic tank is believed to result in no or minimal reduction on nitrogen content in the wastewater effluent, the total nitrogen content can either be measured either at the inlet to the bioreactor garden or the inlet to the overall system (namely, the inlet to the septic tank), and at the discharge point from the bioreactor garden, for purposes of measuring the "at least about 65%" loss in nitrogen content and phosphorous content.

In another embodiment of the invention the bioreactor garden can include aerobic and anaerobic stages (described below). The aerobic and anaerobic stages can be arranged in series either vertically or horizontally. A substantially horizontal arrangement may be desired where the available ground or groundwater is shallow or is bounded by bedrock or a rocky subsurface. The two treatment stages could be separated by a small amount of distance or a larger amount of distance and connected via piped conveyance. After treatment through both the aerobic and anaerobic zones the system would then drain to a leach field, or other aforementioned additional treatment or disposal system.

In any of the foregoing embodiments, the self-regenerating bioreactor garden can react with nitrogen-containing compounds and phosphorus-containing compounds in the untreated wastewater effluent to cause the treated wastewater effluent to have a nitrogen content at least about 65% less than a nitrogen content of the untreated or minimally treated wastewater effluent. Additionally, the treated wastewater effluent can have a phosphorus content at least about 65% less than a phosphorus content of the untreated or minimally treated wastewater effluent.

Still another embodiment of the invention is directed to a process for treating wastewater, including the following steps:

feeding untreated wastewater to an initial treatment system;

separating at least some solids to from the untreated wastewater in the initial treatment system, leaving an untreated or minimally treated wastewater effluent;

feeding the untreated or minimally treated wastewater effluent from the septic tank into a self-regenerating bioreactor garden;

reacting the untreated or minimally treated wastewater effluent in the bioreactor garden to yield a treated wastewater effluent having a nitrogen content that is at least about 65% less than a nitrogen content of the untreated or minimally treated wastewater effluent entering the self-regenerating bioreactor garden and a phosphorus content that is at least about 65% less than a phosphorus content of the untreated or minimally treated wastewater effluent.

The foregoing and other features and advantages of the invention will be further apparent from the following detailed description read in conjunction with the drawings.

DETAILED DESCRIPTION OF THE INVENTION

Figure 1:
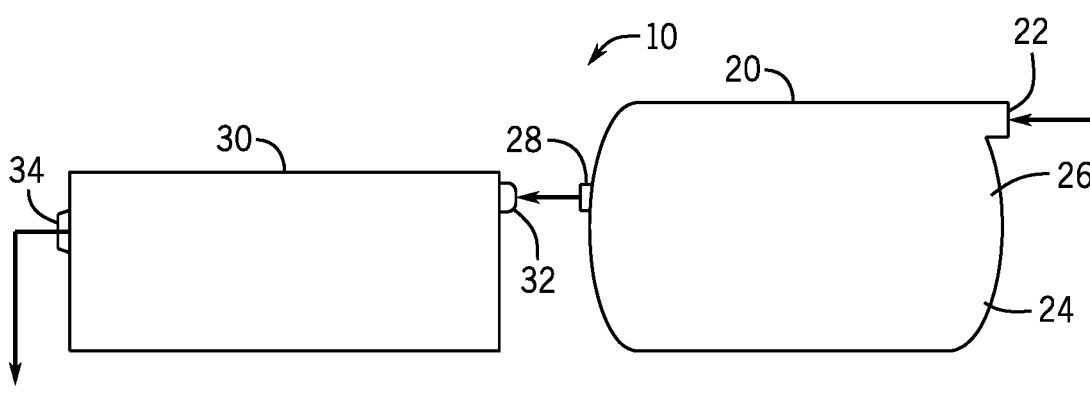
FIG. 1 is a schematic front view of one example of the wastewater treatment system according to the invention.
Figure 2:
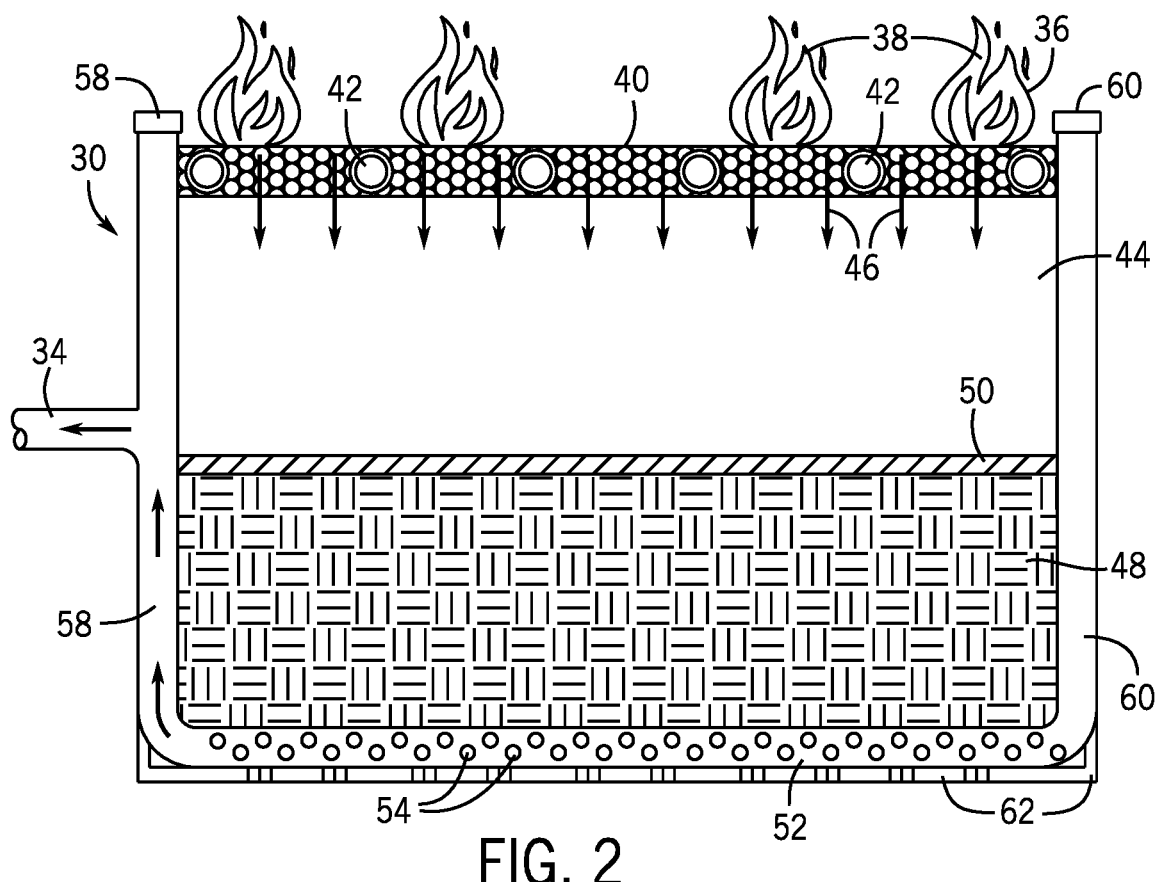
FIG. 2 is a schematic front view of one embodiment of a self-regenerating bioreactor garden useful in the wastewater treatment system according to the invention.

Referring to FIGS. 1 and 2, the wastewater treatment system 10 includes an initial treatment system which can include a septic tank 20 upstream from and connected in series with a self-regenerating bioreactor garden 30. As an alternative to the septic tank 20, the initial treatment system can be a group septic system, a primary or secondary packaging plant, a primary or secondary wastewater treatment system, or any other system that discharges untreated or minimally treated wastewater effluent to the self-regenerating bioreactor garden 30. The septic tank 20 can be of conventional design, whereas the bioreactor garden 30 can be uniquely designed to be self-regenerating for an indefinite period of time, with minimal maintenance. These features make the self-regenerating bioreactor garden uniquely suitable for use with individual households and buildings, greenhouses, and other temporary and permanent locations. In one embodiment, the wastewater treatment system 10, or the bioreactor garden 30 portion of it, can be made portable and can be moved from one location to another as the need arises. In another embodiment, the wastewater treatment system 10, and the bioreactor garden 30 portion of it, can be permanently installed in a specific location and can be completely above ground or at least partially underground.

When the initial treatment system includes a septic tank 20, the septic tank 20 should have sufficient volume to allow solid components to settle and accumulate for extended periods of time, for example one to three years, before the solids accumulate to a level that requires pumping and removal from the septic tank. The septic tank 20 can be of conventional size and shape. For example, the septic tank 20 can have a volume of about 500 to about 20,000 gallons, or about 750 to about 5000 gallons, depending on the amount of wastewater being discharged from the household or other building or source. The septic tank 20 can be constructed from a heavy-duty plastic or plastic composite or concrete and can be positioned above ground or underground.

The septic tank 20 can receive untreated wastewater directly from a household or other building via an inlet 22, whereupon the untreated wastewater can reside in the septic tank for a time sufficient to enable meaningful separation and settling of solid waste material in a bottom portion 24 of the septic tank 20. The untreated wastewater can have an average residence time in the septic tank 20 of about 0.5 to about 2 days to effect meaningful settlement of solid waste from a mostly liquid untreated wastewater effluent. The residence time can be longer if the wastewater treatment system 10 experiences minimal use for a period of time. The untreated wastewater effluent reaches a target level in the upper portion 26 of the septic tank 20 and exits the septic tank 20 through an effluent outlet 28, which can in turn feed directly into the bioreactor garden 30 through an effluent inlet 32.

The untreated wastewater effluent is treated in bioreactor garden 30 and can, in one embodiment. exit as treated wastewater effluent through effluent outlet 34 before being deposited in the surrounding ground or other environment. In another embodiment, discussed below, the bioreactor garden 30 can be designed so that some or all, or a controlled amount of treated wastewater effluent exits vertically downward through a bottom of the bioreactor garden 30. In still another embodiment, discussed below, the bioreactor garden 30 can be designed and sized so that all or substantially all of the treated wastewater effluent is absorbed and transpired by the self-regenerating plants in the top layer of the bioreactor garden 30.

The bioreactor garden 30 is specially designed for self-regeneration and is also specially designed to cause a dramatic reduction in nitrogen, phosphorus, and sediment, among other pollutants in the wastewater effluent. Referring to FIG. 2, the self-regenerating bioreactor garden 30 can include a top layer 36 of plants that are native to the local environment. For example, when the native environment is Hawaii, the top layer 36 can include a self-regenerating sterile cultivar called "Sunshine" vetiver grass (*Chrysopogon zizanioides*) 38 as shown in FIG. 2. Additionally or alternatively, the top layer 36 can include one or more self-generating native plants selected from a palate of species that tolerate their roots being partially inundated for a period of time. In Hawaii this may include any number of restoration species including "Sunshine" vetiver grass (*Chrysopogon zizanioides*) and/or native species such as Uhaloa *Waltheria Indica, Waltheria Americana*, Koki'o ke'oke'o *Hibiscus arnottianus*, Makaloa *Cyperus laevigatus*, Akakai *Schoenoplectiella tabernae*, Ahuawa *Mariscus javanicus*, Ko'oko' olau *Bidens torta*, Ilima *Sida fallax*, Ulei *Osteomeles anthyllidifolia*, A' ali'i *Dodonaea viscosa*, Hawaiian tree fern, Hawaiian coral tree, Hawaiian coral reef, lace fern, *hibiscus*, and combinations thereof. In the southern US this could include any native non-woody species that tolerate their roots being inundated for a period of time as well as sterile restoration species such as "Sunshine" vetiver. The term "self-regenerating plants" means that the plants will grow and replenish on their own in the bioreactor garden 30 using feedstock provided by the untreated wastewater effluent entering the bioreactor 30. In so doing, the nitrogen-containing compounds, phosphorus-containing compounds, and other pollutants entering the bioreactor garden 30 with the untreated wastewater effluent will chemically react and break down so that most of the nitrogen-containing compounds, phosphorus-containing compounds and other pollutants are either released in a safer, non-polluting form (for example, as nitrogen gas), are absorbed into the self-regenerating bioreactor garden 30 (e.g., as food and nutrients for the self-regenerating plants), and/or are treated using the aerobic nitrifying and anaerobic denitrifying mechanisms in the internal layers of the bioreactor garden as explained below. Key to the self-regenerating aspect of the bioreactor garden 30 is that the plants in layer 36 are native or readily adaptive to the local environment and are present in an amount that is compatible with the volume and composition of wastewater effluent entering the bioreactor garden 30.

In one embodiment, the top (plant) layer 36 if bioreactor garden 30 can include a protective material (not shown) that can restrict an amount of rainwater penetrating the top layer 36 from above. Excessive amounts of rainwater can overwhelm the plants in the top layer 36 and can interfere with the bioreactor garden 30 in processing the untreated or minimally treated wastewater effluent received from the initial treatment system, such as septic tank 20. The protective material can be a porous, semi-porous or otherwise impermeable plastic liner that has sufficient openings to expose the plants in the top layer 36 yet covers part of the surrounding area to slow down and restrict the infusion of rainwater. The protective material can also be a dense or compressed layer of soil, bentonite clay, sand and/or wood-chips surrounding the plants, through which the penetration and flow of rainwater are restricted. Other materials can also be used to form a protective, water-restrictive layer through which the plants in top layer 36 emerge.

Using aerobic nitrifying and anaerobic denitrifying mechanisms explained below, combined with the uptake and transpiration of wastewater effluent in the plant layer, the bioreactor garden 30 is suitably designed so that at the nitrogen concentration of treated wastewater effluent exiting the bioreactor garden 30 via effluent outlet 34 or otherwise (e.g., through the bottom of bioreactor garden 30) is at least about 65% less, or at least about 75% less, or at least about 85% less than the nitrogen concentration of the incoming untreated wastewater effluent in the system 10 and/or the bioreactor garden 30. The bioreactor garden 30 can also be designed so that the phosphorus concentration of treated wastewater effluent exiting the bioreactor garden 30 via effluent outlet 34 or otherwise is at least about 65% less, or at least about 75% less, or at least about 80% less than the phosphorus concentration of the incoming untreated wastewater effluent in the system 10 and/or the bioreactor garden 30. The bioreactor garden 30 can also be designed so that the sediment concentration of treated wastewater effluent exiting the bioreactor garden 30 via effluent outlet 34 or otherwise is at least about 80% less, or at least about 90% less, or at least about 95% less than the sediment concentration of the incoming untreated wastewater effluent in the system 10 and/or the bioreactor garden 30. These reductions can be accomplished using an average residence time of the untreated wastewater effluent in the bioreactor garden 30 of about 18 hours to about 5 days, or about 1 day to about three days, depending on the flow rate and composition of the untreated wastewater effluent and the size of the bioreactor garden 30. The foregoing reductions in pollutants in the treated wastewater effluent relative to the untreated wastewater effluent are more than sufficient to meet the NSF 245 standards for wastewater nitrogen reduction, which require at least a 50% reduction in total nitrogen content in the system 10. The stated reductions in nitrogen, phosphorus and other pollutants are weight percentages based on the respective total amounts of nitrogen, phosphorus, and other pollutants in the untreated or minimally treated wastewater effluent entering the bioreactor garden. For example, the amounts of nitrogen and phosphorus include all nitrogen, phosphorus and other applicable pollutants that are present in any form, including chemical compounds that are broken down in the self-regenerating bioreactor garden 30.

Figure 3:
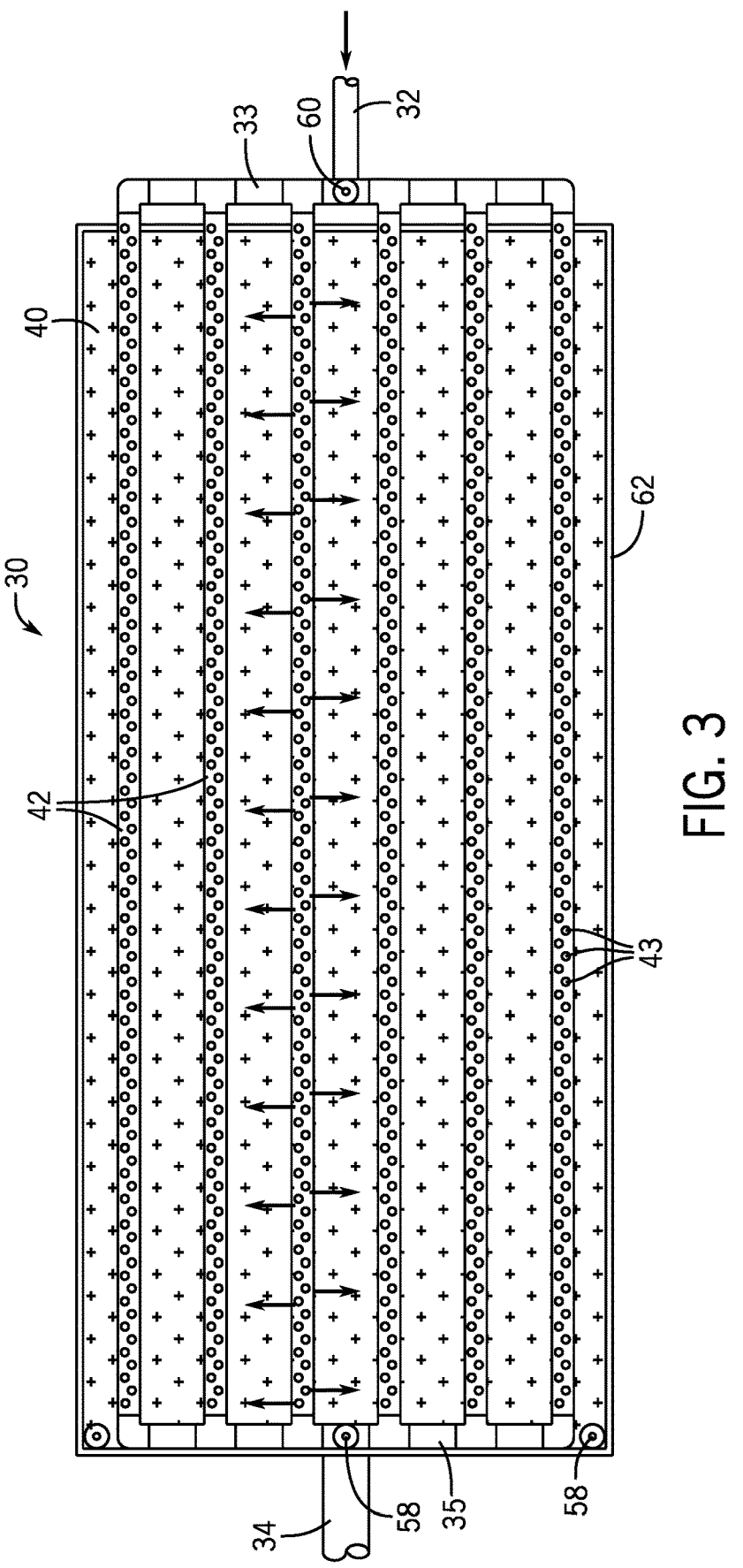
FIG. 3 is a top view of an inlet pipe network that can be used to feed and distribute untreated wastewater effluent to the self-regenerating bioreactor garden.

The self-regenerating bioreactor garden 30 includes a nitrifying layer 40 in which the self-regenerating native plants 38 of plant layer 36 can grow and sprout through. The nitrifying layer 40 can include one or more of soil, concrete sand, basalt aggregate, gravel, quartz sand, biochar, granulated activated carbon (GAC), crushed glass, and combinations thereof. The nitrifying layer 40 can be directly beneath the plant layer 36 and encompasses at least a portion of the roots of the self-regenerating native plants 38. The nitrifying layer 40 can include an embedded plurality of inlet pipes 42 which can be substantially evenly spaced apart. The inlet pipes 42 can branch from the effluent inlet 32 via connecting pipes 33 and can be joined on both ends to connecting pipes 33 and 35 as shown in FIG. 3. Each inlet pipe 42 can be equipped with a plurality of holes 43 formed in its respective sidewall along its length. The spacing of the inlet pipes 42 from each other and the spacing of holes 43 along each pipe 42 can function to distribute the untreated wastewater effluent evenly along and within the soil layer 40. Other options for other techniques to provide uniform distribution to the system may include but are not limited to proprietary products like the Infiltrator, or a perforated pipe combined with a partial impermeable barrier or root barrier material between the aerobic and anaerobic layers.

The nitrifying layer 40 can be fortified with aerobic nitrifying bacteria. Aerobic bacteria are bacteria that can grow and live wherever oxygen is present. Aerobic nitrifying bacteria break down ammonia in the untreated wastewater effluent by converting it into nitrite and ultimately nitrate. Suitable nitrifying bacteria can include without limitation *Nitrosomonas, Nitrosococcus, Nitrobacter, Nitrospira, Nitrospina, Nitrococcus*, and combinations thereof. The nitrifying bacteria are also self-regenerating and can reproduce as needed to meet the quantity of nitrogen-containing compounds entering the soil layer 40 via the untreated wastewater effluent.

A sand layer 44, which can be relatively thick and can act as a second nitrifying layer, can be positioned directly below the nitrifying layer 40. In one embodiment, the self-regenerating plant(s) can be planted with roots partially in the sand layer 40, enabling the sand layer 40 to serve as a second nitrifying layer. In one embodiment, the sand layer 44 can have a thickness that is about 3 to about 7 times the thickness of the nitrifying layer 40. For example, the nitrifying layer 40 may have a thickness or depth of about 4 inches and the sand layer 44 may have a thickness or depth of about 20 inches. The sand layer 44 can include sand that is native to the local environment. In Hawaii, for example, suitable sands may include Hawaiian black sand, which is derived from lava ejected from volcanoes. Alternatively, the sand layer 44 can include one or more of concrete sand, basalt aggregate, quartz sand, and other common sands that are not necessarily native to the environment. The sand layer 44 may also include synthetic engineered sand made using plastic, recycled glass, and other synthetic materials.

In one embodiment, the nitrifying layer 40 and the sand layer 44 together can simulate a construction of a native wetland, such as a constructed Hawaiian wetland. Untreated wastewater effluent that is not utilized by the plant layer 36 or fully treated in the nitrifying layer 40 can pass downward through the sand layer 44 in the direction of arrows 46. In order to facilitate purification of the untreated wastewater effluent that is not processed by the plant layer or the nitrifying layer 40, the sand layer 44 can be designed as a second nitrifying layer and can be fortified with self-regenerating nitrifying bacteria, including without limitation *Nitrosomonas, Nitrosococcus, Nitrobacter, Nitrospira, Nitrospina, Nitrococcus,* and combinations thereof. The nitrifying bacteria breaks down ammonia from the wastewater effluent in the sand layer 44, into nitrite and ultimately nitrate.

A similarly thick fortified woodchip layer 48 can be positioned as a base layer below the sand layer 44 or, in situations where the ground has a shallow depth due to bedrock or rocky ground, can be positioned sideways and substantially horizontal relative to the sand layer 44. For example, in the embodiment where the sand layer 40 has a thickness of about 20 inches, the fortified woodchip layer 48 can have a thickness of about 18 inches. The wood chip layer 48 can be fortified in two ways. First, the woodchips can be mixed with biochar. Biochar is a charcoal-like substance that can be made by burning biomass material from agricultural and forestry wastes in a controlled pyrolysis process at about 350° C. to about 550° C. The pyrolysis occurs inside an enclosure with very little oxygen so that little or no contaminating fumes are released into the atmosphere. The resulting carbon is stable and is cleaner than conventional charcoal. Biochar is black, lightweight, highly porous, and fine-grained. Biochar typically contains about 50% to about 90% by weight fixed carbon, up to about 40% by weight volatile organic matter, about 1% to about 15% by weight water, and about 0.5% to about 5% by weight mineral ash. Volatile organic matter can be quantified using ASTM D1762-84. The fortified woodchip layer 48 can include about 50 to about 98% by volume woodchips and about 2 to about 50% by volume biochar, suitably about 3 to about 30% by volume woodchips and about 60 to about 97% by volume biochar, or about 5 to about 15% by volume woodchips and about 85 to about 95% by volume biochar.

The fortified woodchip layer 48 can also contain a quantity of self-regenerating denitrifying bacteria which reacts with the nitrate formed in nitrifying layer 40 and sand layer 44 under anoxic (anaerobic) conditions to convert the nitrate into non-polluting nitrogen gas. The term "anoxic" means very little free oxygen is present at this stage. Examples of denitrifying bacteria include without limitation *Thiobacillus denitrificans, Micrococcus denitrificans, Serratia denitrificans, Pseudomonas denitrificans, Achromobacter denitrificans,* and combinations thereof. In order to preserve the relatively anoxic environment and prevent descent of the plant roots and intermixing of sand layer 44 and fortified woodchip layer 48, a permeable (e.g., porous) root-blocking layer 50 can be positioned between the sand layer 44 and the fortified woodchip layer 48. The permeable root-blocking layer 50 can be formed of a permeable plastic material, porous plastic sheet, wire mesh screen, or another suitable material that allows the wastewater effluent to easily flow from the sand layer 44 into the fortified woodchip layer 48, while preventing or minimizing any mixing of the two layers together.

One or more collecting pipes 52 having a plurality of entrance openings 54 can be positioned below and surrounding at least the fortified woodchip layer 48 and optionally the sand layer 42. The collecting pipes 52 can be arranged in an evenly spaced network similar to the inlet pipes 42 shown in FIG. 3, with openings 54 spaced along the length of each collecting pipe, to provide for even collection of treated wastewater effluent from the fortified woodchip layer 48. After the wastewater effluent passes through the soil layer 40, the sand layer 44 and the fortified woodchip layer 48, it has been fully treated for maximum removal of nitrogen, phosphorus, sediment, and other pollutants. The purpose of the entrance openings 54 and the collecting pipes 52 is to recover the fully treated wastewater effluent and discharge it through the outlet 34 into the ground or other surrounding environment. The collecting pipes 52 and the inlet pipes 42 can be connected to cleanout flushing pipes 58 and 60 on one or both ends of the collecting pipes 52 and the inlet pipes 42, which can be used for clean water flushing and maintenance of the collecting pipes 52 and inlet pipes 42 as needed.

Wastewater effluent from the initial treatment system can flow through the bioreactor garden 30 in a generally vertical direction from the top (plant) layer 36 and down through the nitrifying layer 40, sand layer 44, and fortified wood chip layer 48, where the treated wastewater effluent can enter the collecting pipes 52. In an alternative embodiment, the bioreactor garden 30 can be designed with a porous or otherwise open bottom that releases some or all of the treated wastewater vertically into the environment. This can be done, for example, by providing either a porous liner or a layer of bentonite or clay beneath the fortified woodchip layer 48 that enables either partial or total flow of the treated wastewater through the bottom of the bioreactor garden 30.

The entire self-regenerating bioreactor garden 30, including the nitrifying layer 40, sand layer 44, porous root-blocking layer 54, fortified woodchip layer 48 and collecting pipe 52, can be surrounded and contained on the bottom and sides by a frame 62. The frame 62 can be lined with an impermeable liner which can, for example, be constructed of ethylene-propylene diene monomer elastomer (EPDM), reinforced polyethylene, high-density polyethylene, or another suitable material, and can be placed in an excavation. The liner may be needed where there is a high groundwater table in the surrounding soil or when the soil has a quick infiltration rate for water. The frame 62 can be constructed as a large wooden box wherein the plastic liner can prevent seepage in and out of the bioreactor garden 30 except through the designated inlet and outlet channels. The frame 62 can also be formed of a plastic composite, a plastic/wood composite, or another suitable structural material that is capable of housing the bioreactor garden 30, in which case an additional plastic liner may not be needed. The frame 62 can have an open or partially open bottom if direct vertical ejection of treated wastewater is desired. The frame 62 and the enclosed bioreactor garden 30 can be placed above ground or underground, except that the soil layer 40 and plant layer 36 should remain above ground, open and exposed to the environment.

In one embodiment, the frame 62 can be constructed of a durable plastic or concrete material that enables portable transport of the bioreactor garden 30 from a first location to a second location, The first location can be a manufacturing and/or temporary storage location or can be a first destination of use. The second location can be any destination of use.

The self-regenerating bioreactor garden 30 not only reduces the concentrations of pollutants in the treated wastewater effluent relative to the concentrations of pollutants in the untreated wastewater effluent but can also reduce the quantity of treated wastewater effluent relative to the quantity of untreated wastewater effluent. This is because some of the wastewater effluent can be processed and absorbed by the plants in the plant layer 36, and/or evaporated, leaving less of the wastewater effluent for further processing in the sand layer 44 and fortified wood chip layer 48. In one embodiment, the self-regenerating bioreactor garden 30 can be sized and designed so that all or a predetermined quantity of the wastewater effluent entering the bioreactor garden 30 can be processed and absorbed by the plants in the plant layer 36 and/or evaporated.

In one embodiment, the treated wastewater effluent from the bioreactor garden 30 can be discharged into a leach field from which it can ultimately enter the environment. The leach field can be designed to remove enough of the remaining nitrogen and other contaminants to enable safe return of the treated wastewater to the environment. In order to minimize the area of land required for the leach field, the leach filed can be provided with vetiver grass and/or other suitable plants that increase the absorption, transpiration, and evaporation of the treated wastewater within a smaller area. In one embodiment, the leach field can be provided with subsurface piping with evenly spaced outlets that facilitate a more even spread of the treated wastewater across the leach field.

In another embodiment, the treated wastewater effluent from the bioreactor garden 30 can be subjected to one or more additional processing steps. For example, the treated wastewater effluent can be filtered using an additional treatment system downstream from the bioreactor garden. The additional treatment system can further layer or layers of biochar and/or sand to further denitrify and purify the treated wastewater. The purified wastewater can then be used for irrigation in applications including, but not limited to, landscaping, agroforestry, agriculture, and greenhouses.

In another embodiment, the purified wastewater can be sterilized by exposing the purified wastewater to a source of ultraviolet radiation, or another sterilization device that can be located downstream from the additional treatment system. The wastewater that has been treated, purified, and sterilized can then be used for drinking, cooking, bathing, and other applications that require clean water. Recycling of the treated and purified wastewater for various applications can be especially beneficial in relatively dry climates that experience periodic water shortages.

EXAMPLES

An individualized wastewater treatment system was constructed using a 1000-gallon above-ground septic tank connected upstream from and in series with an above-ground self-regenerating bioreactor garden having a 14-foot length, a 6-foot width, and a 266 ft$^2$ volume enclosed on four sides and bottom by a rectangular wooden frame and an impermeable plastic liner of high-density polyethylene. The self-regenerating bioreactor garden included a top nitrifying gravel layer about 4 inches deep and sprouting "Sunshine" vetiver grass, a 20-inch deep nitrifying sand layer below the gravel layer in which the roots of the "Sunshine" vetiver grass were implanted, an 18-inch deep fortified woodchip layer below the sand layer, and a permeable barrier layer between the sand layer and the fortified woodchip layer. A plurality of 2-inch inlet distribution pipes of polyvinyl chloride were embedded in the gravel layer and had 0.25-inch holes in the pipe walls for distribution of the untreated wastewater effluent. A similar network of 2-inch polyvinyl chloride exit pipes was positioned below and along the sides of the bioreactor garden as shown in FIG. 2, each exit pipe including a plurality of 0.25-inch openings below the fortified woodchip layer for receiving fully treated wastewater effluent from the fortified woodchip layer. The fortified woodchip layer contained about 90-95% by volume woodchips and about 5-10% by weight biochar. Both the gravel layer and the sand layer contained nitrifying bacteria, and the fortified woodchip layer contained denitrifying bacteria.

A porous root-blocking layer was positioned between the sand layer and the fortified woodchip layer.

The individualized wastewater treatment system was connected to a controlled source of untreated wastewater for sixteen weeks, and the following inflows of untreated wastewater were generated seven days each week:

| Time of Day (hr.) | Volume (Gallons) | Percent of Daily Inflow |
|---|---|---|
| 0600-0900 | 210 | 35 |
| 1100-1400 | 150 | 25 |
| 1700-2000 | 240 | 40 |

During the sixteen weeks (referred to as the "design loading" period), the overall volume of treated wastewater effluent exiting the bioreactor garden was less than the overall volume of untreated wastewater effluent entering bioreactor garden due to consumption by the "Sunshine" vetiver grass and evaporation.

Figure 4:
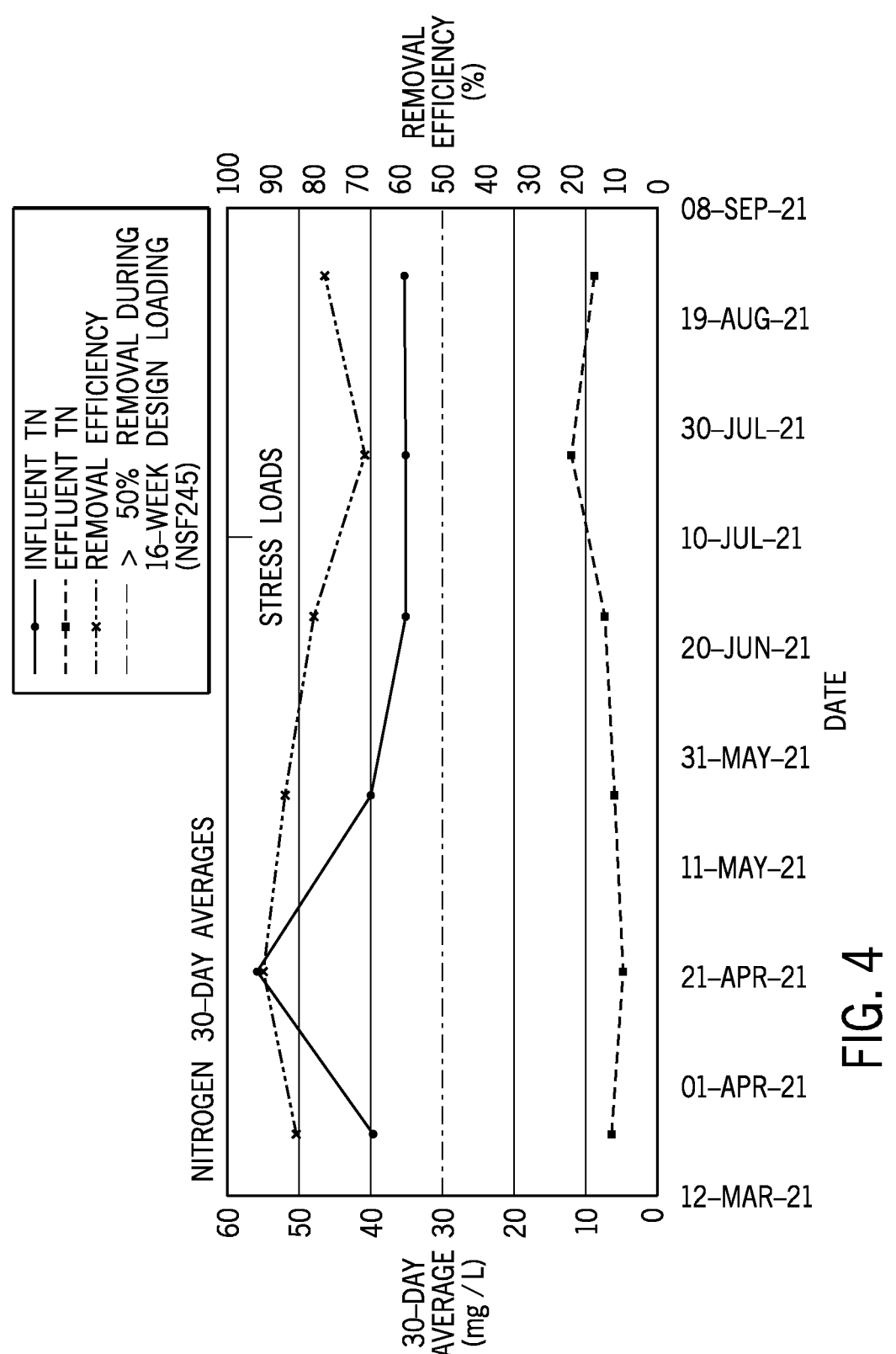
FIG. 4 is a graph showing the total nitrogen contents as a function of time for untreated wastewater effluent entering the self-regenerating bioreactor garden and treated wastewater effluent exiting the bioreactor garden, measured over a 26-week period during the application of standard NSF-consistent tests.

During the sixteen weeks, the nitrogen contents of the untreated wastewater effluent entering the wastewater treatment system (septic tank) and of the treated wastewater effluent leaving the bioreactor garden were measured at periodic intervals using the Total Kjeldahl Nitrogen Test (TKN, STM 4500 N-org) and averaged every 30 days pursuant to NSF 245. The results are shown in FIG. 4, reflecting the initial period from Mar. 12, 2021, to Jun. 20, 2021. The results, plotted in mg/L, indicate a nitrogen content reduction ranging from about 82% to about 92% over the initial 16-week period and the three data points averaged about 87% nitrogen reduction. If one considers the reduction in effluent due to consumption by the plants and evaporation, the overall reduction in nitrogen was even greater.

During the next ten weeks, four stress tests were performed using an NSF 40/NSF 245 protocol. The four stress tests are called 1) "wash day," including three wash loads of 36 gallons per load, split between 0600 and 0900 hours and 1100 and 1400 hours, using detergent and non-chlorine bleach, repeated on Monday, Wednesday and Friday, in addition to the normal design load every day, followed by nine days of normal design loading, 2) "working parent" involving, for five consecutive days, no flow between 0900 and 1700 hours, 40% of normal daily design loading between 0600 and 0900 hours, 60% of normal daily design loading plus one wash load between 1700 and 2000 hours, followed by nine days of normal design loading, 3) "power equipment failure" involving no flow and no power for 48 hours, followed by 60% of normal daily design load plus one wash load in the next three hours, followed by eleven days of normal design loading, and 4) "return from vacation" including no flow for seven days, followed by three hours of high flow including three wash loads, followed by 18 days of normal design loading.

Referring to FIG. 4, the initial nitrogen content of the untreated wastewater effluent was somewhat lower during the four stress-loading periods that occurred between Jun. 20, 2021, and Sep. 1, 2021. The reduction in nitrogen content of the treated wastewater effluent compared to the untreated wastewater effluent ranged from about 70% to about 85% during that period, and nevertheless exceeded the 50% reduction required by NSF 245 by wide margins.

In addition to nitrogen reduction, the National Sanitation Foundation (NSF) provides additional standards for treated wastewater effluent that is released into the environment. The standards include biological oxygen demand (BOD) and carbonaceous biological oxygen demand (CBOD), measured using STM 5210B; total suspended solids (TSS), measured using STM 2540-D; pH, measured using STM 4500-H; and odor. The following Table 1 shows the limits for each parameter and the corresponding values obtained for the treated wastewater effluent exiting the above-described self-regenerating bioreactor garden during the 16-week design loading period:

TABLE 1

| Treated Wastewater Effluent Properties | | | |
| --- | --- | --- | --- |
| Property | Test Method | Limit | Treated Wastewater Effluent |
| CBOD | STM 5210B | ≤25 mg/L mean over 30 days, | 20 mg/L mean over 30 days, |
| | | ≤40 mg/L mean over 7 consecutive days | 19 mg/L mean over 7 consecutive days |
| TSS | STM 2540D | ≤30 mg/L mean over 30 days, | 5 mg/L mean over 30 days, |
| | | ≤35 mg/L, mean over 7 consecutive days | 9 mg/L mean over 7 consecutive days |
| pH | STM 4500 H | 6 to 9 | 7.1 to 8.5 |
| Odor | Panel | Non-offensive | Non-offensive |
| Oily film | Visual | Non-visible other than air bubbles | Non-visible other than air bubbles |
| Foam | Visual | None | None |
| Phosphorus | STM 8190 | Not included in NSF 245 or NSF 40 criteria | 3 mg/L |
| Total Nitrogen | STM 4500-N | 50% removal | 87% removal |

The foregoing results for TSS reflect an average 96% sediment removal, an 80% phosphorus removal, and an 82% reduction in biological oxygen demand over the 16-week design loading period. Overall, the individualized wastewater disposal system met or exceeded the NSF 40 and NSF 245 requirements in every category.

The embodiments of the invention described herein are exemplary. Various modifications and improvements can be made without departing from the spirit and scope of the invention. The scope of the invention is indicated by the appended claims, and all changes that fall within the meaning and range of equivalents are intended to be embraced therein.

We claim:

1. A wastewater treatment system that includes: an initial treatment system adapted to receive untreated wastewater; and a self-regenerating bioreactor garden downstream from and connected in series with the initial treatment system; wherein the self-regenerating bioreactor garden receives initial wastewater effluent from the initial treatment system via a plurality of inlet pipes and releases treated wastewater effluent via one or more collecting pipes and an outlet; the self-regenerating bioreactor garden includes an aerobic nitrifying stage and an anaerobic denitrifying stage arranged in series vertically; and the outlet is arranged at a vertical level above the anaerobic denitrifying stage; wherein the bioreactor garden comprises: a top layer of self-regenerating plants; a nitrifying layer in which the self-regenerating plants grow, wherein the nitrifying layer comprises one or more of soil, concrete sand, basalt aggregate, quartz sand, biochar, granulated activated carbon (GAC), zeolite and crushed glass; a sand layer below the nitrifying layer: a permeable root-blocking layer below the sand layer; and a base layer below the root blocking layer that includes wood chips and biochar.

2. The wastewater treatment system of claim 1, wherein the initial treatment system comprises a septic tank or a group septic system.

3. The wastewater treatment system of claim 1, wherein the initial treatment system comprises a primary or secondary package plant.

4. The wastewater treatment system of claim 1, wherein the initial treatment system comprises a primary or secondary wastewater treatment plant.

5. The wastewater treatment system of claim 1, wherein the nitrifying layer comprises nitrifying bacteria selected from the group consisting of *Nitrosomonas, Nitrosococcus, Nitrobacter, Nitrospira, Nitrospina, Nitrococcus*, and combinations thereof.

6. The wastewater treatment system of claim 1, wherein the layer of sand comprises nitrifying bacteria selected from the group consisting of *Nitrosomonas, Nitrosococcus, Nitrobacter, Nitrospira, Nitrospina, Nitrococcus*, and combinations thereof.

7. The wastewater treatment system of claim 1, wherein the base layer comprises denitrifying bacteria selected from the group consisting of *Thiobacillus denitrificans, Micrococcus denitrificans, Serratia denitrificans, Pseudomonas denitrificans, Achromobacter denitrificans*, and combinations thereof.

8. The wastewater treatment system of claim 1, wherein the self-generating plants comprise "Sunshine" vetiver grass (*Chrysopogon zizanioides*).

9. The wastewater treatment system of claim 1, wherein the self-generating plants comprise one or more of "Sunshine" vetiver grass (*Chrysopogon zizanioides*), Uhaloa *Waltherialndica, Waltheria Americana*, Koki'o ke'oke'o *Hibiscus arnottianus*, Makaloa *Cyperus laevigatus*, Akakai *Schoenoplectiella tabernae*, Ahuawa *Mariscus javanicus*, Ko'oko' olau *Bidens torta*, Ilima *Sida fallax*, Ulei *Osteomeles anthyllidifolia*, A' ali'i *Dodonaea viscosa*, Hawaiian tree fern, Hawaiian coral tree, Hawaiian coral reef, lace fern, *hibiscus*, and combinations thereof.

10. The wastewater treatment system of claim 1, wherein the self-regenerating bioreactor garden reacts with nitrogen-containing compounds in the initial wastewater effluent to cause the treated wastewater effluent to have a nitrogen content at least about 75% less than a nitrogen content of the initial wastewater effluent.

11. The wastewater treatment system of claim 1, wherein the self-regenerating bioreactor garden reacts with nitrogen-containing compounds in the initial wastewater effluent to cause the treated wastewater effluent to have a nitrogen content at least about 85% less than a nitrogen content of the initial wastewater effluent.

12. The wastewater treatment system of claim 1, wherein the self-regenerating bioreactor garden reacts with phosphorus-containing compounds in the untreated or minimally treated wastewater effluent to cause the treated wastewater effluent to have a phosphorus content at least about 65% less than a phosphorus content of the initial wastewater effluent.

13. The wastewater treatment system of claim 1, wherein the self-regenerating bioreactor garden reacts with phosphorus-containing compounds in the initial wastewater effluent to cause the treated wastewater effluent to have a phosphorus content at least about 75% less than a phosphorus content of the initial wastewater effluent.

14. The wastewater treatment system of claim 1, wherein the self-regenerating bioreactor garden processes suspended sediment in the initial wastewater effluent to cause the treated wastewater effluent to have a sediment content at least about 90% less than a sediment content of the initial wastewater effluent.

15. A wastewater treatment system, comprising: a septic tank adapted to receive untreated wastewater from a building; and a self-regenerating bioreactor garden downstream from and connected in series with the septic tank; wherein the self-regenerating bioreactor garden receives initial wastewater effluent from the septic tank via a plurality of inlet pipes and is sized such that the plants in the self-regenerating bioreactor garden uptake and transpire an entirety of the initial wastewater effluent resulting in zero discharge from the wastewater treatment system; the self-regenerating bioreactor garden includes an aerobic nitrifying stage and an anaerobic denitrifying stage arranged in series vertically; and the nitrifying stage and the denitrifying stage are separated by a permeable root blocking layer.

16. A wastewater treatment system, comprising: a septic tank adapted to receive untreated wastewater directly from a building; and a self-regenerating bioreactor garden downstream from and connected in series with the septic tank; wherein the self-regenerating bioreactor garden receives initial wastewater effluent from the septic tank via a plurality of inlet pipes and releases treated wastewater effluent directly into a leaching field via one or more collecting pipes and an outlet; the self-regenerating bioreactor garden includes an aerobic nitrifying stage and an anaerobic denitrifying stage arranged in series vertically; the outlet is arranged at a vertical level above the anaerobic denitrifying stage; and the self-regenerating bioreactor garden reacts with nitrogen-containing compounds and phosphorus-containing compounds in the initial wastewater effluent to cause the treated wastewater effluent to have a nitrogen content at least about 65% less than a nitrogen content of the initial wastewater effluent and a phosphorus content at least about 65% less than a phosphorus content of the initial wastewater effluent; wherein the bioreactor garden comprises: a top layer of self-regenerating plants: an aerobic nitrifying layer in which the self-regenerating plants grow; a-permeable root-blocking layer beneath the aerobic nitrifying layer; a base layer beneath the root blocking layer that includes about 50 to about 98% by volume wood chips and about 2 to about 50% by volume biochar; and a liner surrounding at least part of the top layer, the layer of soil, and the base layer.

17. The wastewater treatment system of claim 16, wherein the nitrifying layer comprises nitrifying bacteria selected from the group consisting of *Nitrosomonas, Nitrosococcus, Nitrobacter, Nitrospira, Nitrospina, Nitrococcus*, and combinations thereof.

18. The wastewater treatment system of claim 16, wherein the base layer comprises denitrifying bacteria selected from the group consisting of *Thiobacillus denitrificans, Micrococcus denitrificans, Serratia denitrificans, Pseudomonas denitrificans, Achromobacter denitrificans*, and combinations thereof.

19. The wastewater treatment system of claim 16, wherein the self-generating plants comprise one or more of "Sunshine" vetiver grass (*Chrysopogon zizanioides*), Uhaloa *Waltheria Indica, Waltheria Americana*, Koki'o ke'oke'o *Hibiscus arnottianus*, Makaloa *Cyperus laevigatus*, Akakai *Schoenoplectiella tabernae*, Ahuawa *Mariscus javanicus*, Ko'oko'olau *Bidens torta*, Ilima *Sida fallax*, Ulei *Osteomeles anthyllidifolia*, A'ali'i *Dodonaea viscosa*, Hawaiian tree fern, Hawaiian coral tree, Hawaiian coral reef, lace fern, *hibiscus*, and combinations thereof.

20. The wastewater treatment system of claim 16, wherein the self-regenerating bioreactor garden reacts with nitrogen-containing compounds and phosphorus-containing compounds in the untreated wastewater effluent to cause the treated wastewater effluent to have a nitrogen content at least about 75% less than a nitrogen content of the initial wastewater effluent entering the bioreactor garden and a phosphorus content at least about 75% less than a phosphorus content of the initial wastewater effluent entering the bioreactor garden.

21. The wastewater treatment system of claim 1, further comprising an additional treatment system downstream from the bioreactor garden that further denitrifies and purifies the treated wastewater to yield purified wastewater suitable for irrigation.

22. The wastewater treatment system of claim 21, wherein the additional treatment system comprises at least one layer formed using biochar and/or sand.

23. The wastewater treatment system of claim 21, further comprising a sterilization device downstream from the additional treatment system that yields sterilized wastewater suitable for drinking, cooking, or bathing.

24. The wastewater treatment system of claim 23, wherein the sterilization device comprises a source of ultraviolet radiation.

25. A wastewater treatment system that includes: an initial treatment system adapted to receive untreated wastewater; and a self-regenerating bioreactor garden downstream from and connected in series with the initial treatment system; wherein the self-regenerating bioreactor garden receives initial wastewater effluent from the initial treatment system via a plurality of inlet pipes and releases treated wastewater effluent via one or more collecting pipes and an outlet or no effluent; the self-regenerating bioreactor garden includes an aerobic nitrifying stage and an anaerobic denitrifying stage arranged in series vertically; the nitrifying stage and the denitrifying stage are separated by a permeable root blocking layer; and the bioreactor garden further includes an effluent outlet arranged at a vertical level above the anaerobic denitrifying stage which transmits any remaining treated wastewater effluent from the bioreactor garden to a surrounding environment; wherein the bioreactor garden comprises: a top layer of self-regenerating plants; a nitrifying layer in which the self-regenerating plants grow, wherein the nitrifying layer comprises one or more of soil, concrete sand, basalt aggregate, quartz sand, biochar, granulated activated carbon (GAC), zeolite and crushed glass; a sand layer below the nitrifying layer; the permeable root-blocking layer below the sand layer; and a base layer that includes wood chips and biochar.

26. The wastewater treatment system of claim 25, wherein the initial treatment system comprises a septic tank, a group septic system, a primary or secondary package plant, or a primary or secondary wastewater treatment plant.

27. The wastewater treatment system of claim 25, wherein the base layer that includes about 50% to about 98% by volume wood chips and about 2% to about 50% by volume biochar; further comprising a liner surrounding at least part of the top layer, the layer of soil, and the base layer.

28. The wastewater treatment system of claim 25, wherein the nitrifying layer comprises nitrifying bacteria selected from the group consisting of *Nitrosomonas, Nitrosococcus, Nitrobacter, Nitrospira, Nitrospina, Nitrococcus*, and combinations thereof and the base layer comprises denitrifying bacteria selected from the group consisting of *Thiobacillus denitrificans, Micrococcus denitrificans, Serratia denitrificans, Pseudomonas denitrificans, Achromobacter denitrificans*, and combinations thereof.

29. The wastewater treatment system of claim 27, wherein the nitrifying layer comprises nitrifying bacteria selected from the group consisting of *Nitrosomonas, Nitrosococcus, Nitrobacter, Nitrospira, Nitrospina, Nitrococcus*, and combinations thereof and the base layer comprises denitrifying bacteria selected from the group consisting of *Thiobacillus denitrificans, Micrococcus denitrificans, Serratia denitrificans, Pseudomonas denitrificans, Achromobacter denitrificans*, and combinations thereof.

30. The wastewater treatment system of claim 25, wherein the self-generating plants comprise one or more of "Sunshine" vetiver grass (*Chrysopogon zizanioides*), Uhaloa *Waltheria Indica, Waltheria Americana*, Koki'o ke'oke'o *Hibiscus arnottianus*, Makaloa *Cyperus laevigatus*, Akakai *Schoenoplectiella tabernae*, Ahuawa *Mariscus javanicus*, Ko'oko'olau *Bidens torta*, lima *Sida fallax*, Ulei *Osteomeles anthyllidifolia*, A'ali'i Dodonaeaviscosa, Hawaiian tree fern, Hawaiian coral tree, Hawaiian coral reef, lace fern, *hibiscus*, and combinations thereof.

31. The wastewater treatment system of claim 27, wherein the self-generating plants comprise one or more of "Sunshine" vetiver grass (*Chrysopogon zizanioides*), Uhaloa *Waltheria Indica, Waltheria Americana*, Koki'o ke'oke'o *Hibiscus arnottianus*, Makaloa *Cyperus laevigatus*, Akakai *Schoenoplectiella tabernae*, Ahuawa *Mariscus javanicus*, Ko'oko'olau *Bidens torta*, llima *Sida fallax*, Ulei *Osteomeles anthyllidifolia*, A'ali'i *Dodonaea viscosa*, Hawaiian tree fern, Hawaiian coral tree, Hawaiian coral reef, lace fern, *hibiscus*, and combinations thereof.

* * * * *